(12) United States Patent
Xing et al.

(10) Patent No.: US 8,896,805 B2
(45) Date of Patent: Nov. 25, 2014

(54) REPAIRING LINE SYSTEM AND REPAIR METHOD THEREOF

(75) Inventors: Junbo Xing, Shenzhen (CN); Chun Liu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 153 days.

(21) Appl. No.: 13/379,816

(22) PCT Filed: Dec. 5, 2011

(86) PCT No.: PCT/CN2011/083438
§ 371 (c)(1),
(2), (4) Date: Dec. 21, 2011

(87) PCT Pub. No.: WO2013/078699
PCT Pub. Date: Jun. 6, 2013

(65) Prior Publication Data
US 2013/0137332 A1    May 30, 2013

(30) Foreign Application Priority Data
Nov. 28, 2011  (CN) .......................... 2011 1 0383914

(51) Int. Cl.
*G02F 1/136*     (2006.01)
*G02F 1/1362*    (2006.01)

(52) U.S. Cl.
CPC ................................ *G02F 1/136259* (2013.01)
USPC ................. 349/192; 349/54; 349/55

(58) Field of Classification Search
CPC ............................................... G02F 1/136259
USPC .............................................. 349/54–55, 192
See application file for complete search history.

(56) References Cited

U.S. PATENT DOCUMENTS

| | | |
|---|---|---|
| 2005/0263772 A1 | 12/2005 | Park |
| 2009/0021665 A1* | 1/2009 | Shiao et al. ..................... 349/54 |
| 2009/0115959 A1 | 5/2009 | Lee et al. |
| 2009/0284679 A1* | 11/2009 | Kim et al. ....................... 349/54 |

FOREIGN PATENT DOCUMENTS

| | | |
|---|---|---|
| CN | 1916700 | 2/2007 |
| CN | 201000518 | 1/2008 |
| CN | 101236309 | 8/2008 |
| CN | 101592830 | 12/2009 |
| CN | 101644838 | 2/2010 |
| KR | 20030030719 | 4/2003 |

* cited by examiner

*Primary Examiner* — Phu Vu
(74) *Attorney, Agent, or Firm* — Mark M. Friedman

(57) ABSTRACT

The present invention discloses a repairing line system, which includes a plurality of packages, a substrate having a plurality of data lines awaiting for repair, two repairing lines, and two connecting lines. The repairing line includes outgoing lines led from the packages and a wire disposed on three sides of the substrate without the packages disposed and coupled to the outgoing lines. The wires insulatively intersect second terminals of the data lines awaiting for repair. The connecting line insulatively intersects the outgoing lines and first terminals of the data lines. The present invention further discloses a repair method of the repairing line system. The repairing line system and the repair method of the present invention utilize the same repairing lines led from different packages to connect with each other for forming whole connected wires, thereby increasing flexibility of the repairing line system in repairing data lines.

8 Claims, 3 Drawing Sheets

| weld outgoing lines and first terminals of data lines awaiting for repair via connecting lines, and weld the wire corresponding to the outgoing lines and second terminals of the data lines awaiting for repair | 401 |

⬇

| cut the connecting line and the wire for separating a replaceable line using same connecting line and same wire | 402 |

REPAIRING LINE SYSTEM AND REPAIR METHOD THEREOF

CROSS-REFERENCE TO RELATED APPLICATIONS

This application is a 371 U.S. National Stage of International Application No. PCT/CN2011/083438, filed Dec. 5, 2011, and claims priority to Chinese patent application No. 201110383914.7, filed Nov. 28, 2011, the disclosures of which are herein incorporated by reference in their entirety.

FIELD OF THE INVENTION

The present invention relates to a liquid crystal display (LCD) panel technology, and especially to a repairing line system and a repair method thereof with regard to the LCD panel.

BACKGROUND OF THE INVENTION

FIG. 1 is a schematic drawing illustrating an LCD panel having a repairing line system in prior art, in which the LCD panel includes a substrate 110, a driver 120, four packages 131, 132, 133 and 134, and four repairing line 141, 142, 143 and 144. The driver 120 inputs signals into data lines 111 for the LCD panel to show corresponding images.

The package 131, 132, 133 and 134 are respectively coupled to the driver 120 and the substrate 110. Both the repairing line 141 and the repairing line 142 are disposed on both sides of the substrate 110 (i.e., both ends of the data line 111) along one side of the substrate 110 sequentially via the packages 131, 132 and the driver 120. The repairing line 143 and the repairing line 144 are disposed on both sides of the substrate 110 along one side of the substrate 110 sequentially via the packages 133, 134 and the driver 120. The repairing line 141 and the repairing line 142 are served as replaceable lines of the data line 111 on the substrate 110, so that the output signal of the driver 120 can be outputted to the data line 111 via the repairing line 141 and the repairing line 142 when the data line 111 is broken.

The repairing line 141 and the repairing line 142 are respectively led from the packages 131, 132 in order to repair the data line 111 led from the packages 131, 132. When the data line 111 is broken at "A" point in the drawing, both ends of the broken data line 111 are respectively coupled to "B" and "C" points of the repairing line 141, whereby the repairing line 141 can replace the broken data line 111 after coupling.

However, the repairing line 141 and the repairing line 142 can repair only two broken data lines within the package 131 and the package 132. That is to say, if there are three broken data lines simultaneously occurring within the package 131 and the package 132, the repairing line 141 and the repairing line 142 cannot repair the three broken data lines. Those of the package 133 and the package 134 can be repaired through the repairing line 143 and the repairing line 144, but the repairing line 143 and the repairing line 144 also can repair only two broken data lines within the package 133 and the package 134.

In summary, each package of the conventional repairing line system on the LCD panel can repair only two broken data lines through the repairing lines, and each half LCD panel can repair only two broken data lines through the repairing lines. If above two broken data lines occur in some package, all the broken data lines of the package cannot be repaired.

Therefore, there is a significant need to provide a repairing line system and a repair method thereof for solving the problems existing in the prior art.

SUMMARY OF THE INVENTION

An objective of the present invention is to provide a repairing line system and a corresponding repair method, which utilize the same repairing lines led from different packages to connect with each other for forming whole connected wires, thereby increasing flexibility of the repairing line system in repairing data lines and then solving the drawback that multiple broken data lines occurring in a single package cannot be repaired in the conventional LCD panel.

To achieve the foregoing objective, the technical solution of this invention is implemented as follows.

The present invention relates a repairing line system which includes a plurality of packages and a substrate, and the substrate has a plurality of data lines thereon awaiting for repair. The repairing line system further includes: two repairing lines, the repairing line comprising outgoing lines led from the packages and a wire disposed on three sides of the substrate without the packages disposed and coupled to the outgoing lines, the wires insulatively intersecting second terminals of the data lines awaiting for repair; and two connecting lines, the connecting line insulatively intersecting the outgoing lines and first terminals of the data lines.

In the repairing line system of the present invention, each of the repairing lines includes four outgoing lines, the four outgoing lines respectively led from four packages, each terminal of the wire coupling to the two outgoing lines.

In the repairing line system of the present invention, the repairing line system further includes signal amplifiers coupled to the repairing lines and utilized to amplify data signals, and the outgoing line is coupled to the wire via the signal amplifier.

The present invention further relates a repair method of a repairing line system. The repairing line system includes a plurality of packages, a substrate having a plurality of data lines awaiting for repair, two repairing lines and two connecting lines. The repairing line includes outgoing lines led from the packages and a wire disposed on three sides of the substrate without the packages disposed and coupled to the outgoing lines. The repair method of the repairing line system includes the step of: A, connecting the outgoing lines and first terminals of the data lines awaiting for repair via the connecting lines, and connecting the wire corresponding to the outgoing lines and second terminals of the data lines awaiting for repair; B, cutting the connecting line and the wire for separating a replaceable line using same connecting line and same wire; and C, amplifying data signals on the repairing lines.

The present invention further relates a repair method of a repairing line system. The repairing line system includes a plurality of packages, a substrate having a plurality of data lines awaiting for repair, two repairing lines and two connecting lines. The repairing line includes outgoing lines led from the packages and a wire disposed on three sides of the substrate without the packages disposed and coupled to the outgoing lines. The repair method of the repairing line system includes the step of: A, connecting the outgoing lines and first terminals of the data lines awaiting for repair via the connecting lines, and connecting the wire corresponding to the outgoing lines and second terminals of the data lines awaiting for repair; B, cutting the connecting line and the wire for separating a replaceable line using same connecting line and same wire.

In the repair method of the repairing line system of the present invention, the repairing lines include a first repairing line and a second repairing line, and both the first repairing line and second repairing line include four outgoing lines, the four outgoing lines respectively led from a first, a second, a third and a fourth package, each terminal of the wire coupling to the two outgoing lines. The connecting line includes a first connecting line and a second connecting line.

In the repair method of the repairing line system of the present invention, the data lines awaiting for repair include a first data line awaiting for repair, a second data line awaiting for repair and a third data line awaiting for repair. The step A specifically comprises: connecting the first connecting line and the outgoing line of the second repairing line led from the first package, then connecting the first connecting line and the first terminal of the first data line awaiting for repair, connecting the wire of the second repairing line and the second terminal of the first data line awaiting for repair; connecting the second connecting line and the outgoing line of the first repairing line led from the first package, then connecting the second connecting line and the first terminal of the second data line awaiting for repair, connecting the wire of the first repairing line and the second terminal of the second data line awaiting for repair; connecting the first connecting line and the outgoing line of the first repairing line led from the third package, then connecting the first connecting line and the first terminal of the third data line awaiting for repair, connecting the wire of the first repairing line and the second terminal of the third data line awaiting for repair.

In the repair method of the repairing line system of the present invention, the step B specifically comprises: cutting the first connecting line located between a connection point of the first connecting line and the first data line awaiting for repair and a connection point of the first connecting line and the third data line awaiting for repair; cutting the first repairing line located between a connection point of the first repairing line and the second data line awaiting for repair and a connection point of the first repairing line and the third data line awaiting for repair.

In the repair method of the repairing line system of the present invention, the data lines awaiting for repair include a first data line awaiting for repair, a second data line awaiting for repair, a third data line awaiting for repair and a fourth data line awaiting for repair. The step A specifically comprises: connecting the first connecting line and the outgoing line of the second repairing line led from the first package, then connecting the first connecting line and the first terminal of the first data line awaiting for repair, connecting the wire of the second repairing line and the second terminal of the first data line awaiting for repair; connecting the second connecting line and the outgoing line of the first repairing line led from the first package, then connecting the second connecting line and the first terminal of the second data line awaiting for repair, connecting the wire of the first repairing line and the second terminal of the second data line awaiting for repair; connecting the first connecting line and the outgoing line of the first repairing line led from the third package, then connecting the first connecting line and the first terminal of the third data line awaiting for repair, connecting the wire of the first repairing line and the second terminal of the third data line awaiting for repair; connecting the second connecting line and the outgoing line of the second repairing line led from the third package, then connecting the second connecting line and the first terminal of the fourth data line awaiting for repair, connecting the wire of the second repairing line and the second terminal of the fourth data line awaiting for repair.

In the repair method of the repairing line system of the present invention, the step B specifically comprises: cutting the first connecting line located between a connection point of the first connecting line and the third data line awaiting for repair and a connection point of the first connecting line and the first data line awaiting for repair; cutting the first repairing line located between a connection point of the first repairing line and the second data line awaiting for repair and a connection point of the first repairing line and the third data line awaiting for repair; cutting the second connecting line located between a connection point of the second connecting line and the second data line awaiting for repair and a connection point of the second connecting line and the fourth data line awaiting for repair; cutting the second repairing line located between a connection point of the second repairing line and the first data line awaiting for repair and a connection point of the second repairing line and the fourth data line awaiting for repair.

In the repair method of the repairing line system of the present invention, The repair method of the repairing line system further includes the step of: C, amplifying data signals on the repairing lines.

The advantageous effects of the repairing line system and the repair method thereof implementing the present invention lie in the following:

Because of the connecting lines which insulatively intersect the data lines and the repairing lines in the present invention, when the data line is broken, the first terminals of the outgoing line and the data line awaiting for repair of the repairing line corresponding to the package are respectively coupled to the connecting line. Meanwhile, the wire of the corresponding repairing line is coupled to the second terminal of the data line awaiting for repair, and the replaceable line is formed by cutting the connecting line between a part of the connection points thereby replacing the data lines awaiting for repair to perform signal communication. Therefore, the multiple broken data lines occurring in the single package can be repaired.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
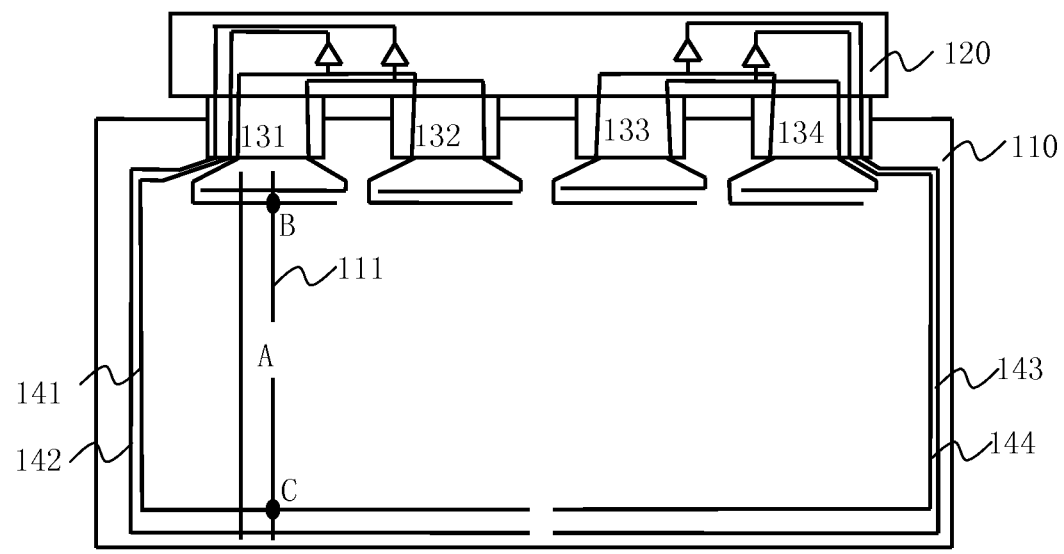
FIG. 1 is a schematic drawing illustrating a repairing line system for repairing broken line in prior art.
Figures 2, 3:
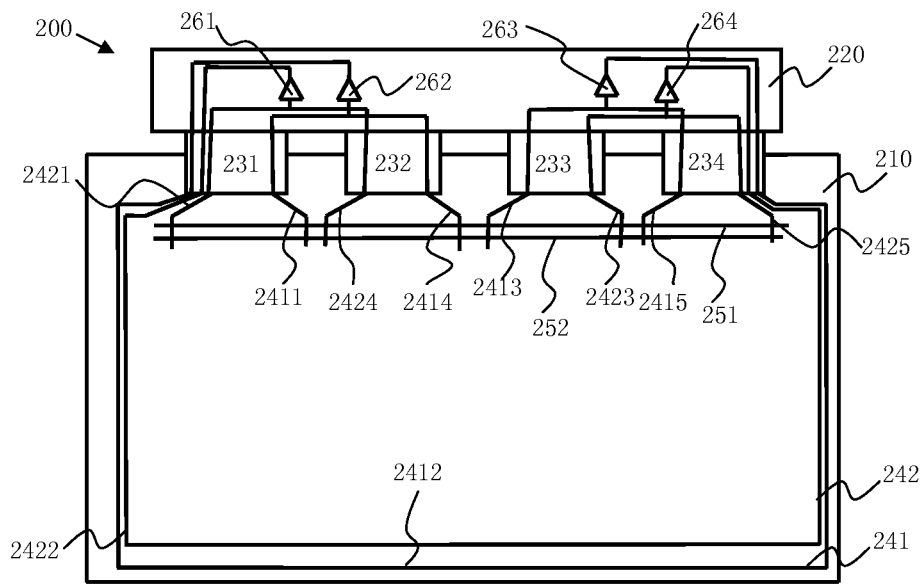
FIG. 2 is a schematic drawing illustrating a repairing line system according to a preferred embodiment of the present invention.
FIG. 3 is a flow chart illustrating a repair method of the repairing line system according to the preferred embodiment of the present invention.

FIG. 2 depicts a schematic drawing illustrating a repairing line system according to a preferred embodiment of the present invention. The repairing line system 200 includes a substrate 210 and a driver 220. There are a plurality of data lines (not shown) parallel disposed on the substrate 210, ends of the data lines converge to the first package 231, the second package 232, the third package 233, and the fourth package 234 according to distribution positions thereof on the substrate 210.

The repairing line system 200 further includes a first repairing line 241 and a second repairing line 242. The first repairing line 241 and the second repairing line 242 respectively led from a first package 231, a second package 232, a third package 233, and a fourth package 234. The repairing line system further includes a first connecting line 251 and a second connecting line 252.

The first repairing line 241 includes an outgoing line 2411, an outgoing line 2413, an outgoing line 2414, an outgoing line 2415 and a wire 2412. The outgoing line 2411, 2413, 2414, and 2415 are respectively led from the package 231, 233, 232, and 234, and the wire 2412 is disposed on three sides of the substrate 210 without the packages disposed 231, 232, 233, and 234. Ends of the outgoing lines 2411 and 2414 insulatively intersect the first connecting line 251 and the second connecting line 252, and opposite ends thereof are coupled to the wire 2412 via a signal amplifier 262. Ends of the outgoing lines 2413 and 2415 insulatively intersect the first connecting line 251 and the second connecting line 252, and opposite ends thereof are coupled to the wire 2412 via a signal amplifier 263.

The second repairing line 242 includes an outgoing line 2421, an outgoing line 2423, an outgoing line 2424, an outgoing line 2425 and a wire 2422. The outgoing line 2421, 2423, 2424, and 2425 are respectively led from the package 231, 233, 232, and 234, and the wire 2422 is disposed on three sides of the substrate 210 without the packages disposed 231, 232, 233, and 234. Ends of the outgoing lines 2421 and 2424 insulatively intersect the first connecting line 251 and the second connecting line 252, and opposite ends thereof are coupled to the wire 2422 via a signal amplifier 261. Ends of the outgoing lines 2423 and 2425 insulatively intersect the first connecting line 251 and the second connecting line 252, and opposite ends thereof are coupled to the wire 2422 via a signal amplifier 264.

The first connecting line 251 and the second connecting line 252 insulatively intersect first terminals of the data line (not shown), and the wire 2412 and the wire 2422 insulatively intersect second terminals of the data lines respectively.

In the preferred embodiment of the present invention, the signal amplifiers 261, 262, 263, and 264 are utilized to amplify data signals. Because the transmission path of the repairing line is generally longer than the data line awaiting for repair, it is easy to cause signal distortion. The signals are amplified by the signal amplifiers in advance and then are transmitted through the repairing line thereby preventing the signal distortion caused by signal loss along the transmission path.

Referring to FIG. 3, FIG. 3 is a flow chart illustrating a repair method of the repairing line system according to the preferred embodiment of the present invention. The repair method includes the steps of: step 401: welding the outgoing lines and first terminals of the data lines awaiting for repair via the connecting lines, and welding the wire corresponding to the outgoing lines and second terminals of the data lines awaiting for repair; step 402: cutting the connecting lines and the wire for forming replaceable lines.

In the preferred embodiment of the present invention, the repair method of the repairing line system further includes the step of: amplifying data signals of the repairing lines. Because the transmission path of the repairing line is generally longer than the data line awaiting for repair, it is easy to cause signal distortion. The signals are amplified in advance and then are transmitted through the repairing line thereby preventing the signal distortion caused by signal loss along the transmission path.

The repairing line system and the repair method of the present invention will now be described in detail with reference to the LCD panel having three and four data lines awaiting for repair.

Figure 4:
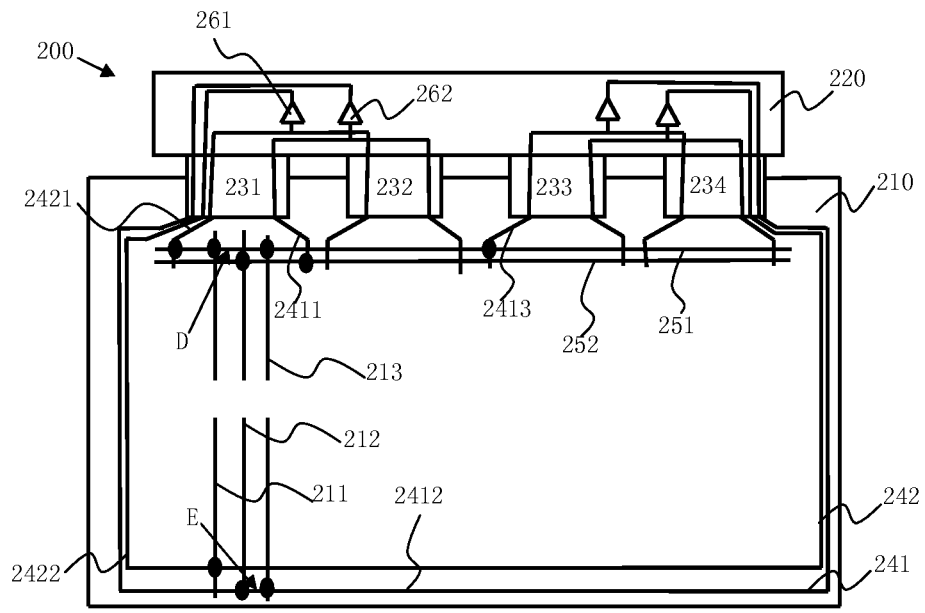
FIG. 4 is a schematic drawing illustrating a repairing line system and a repair method for repairing three data lines awaiting for repair according to the present invention.

Referring to FIG. 4, FIG. 4 is a schematic drawing illustrating a repairing line system and a repair method for repairing three data lines awaiting for repair according to the present invention. When there are three data lines of the data lines awaiting for repair existing in the same package on the substrate 210, as there are a data line awaiting for repair 211, a data line awaiting for repair 212, and a data line awaiting for repair 213 existing in the first package 231.

The step 401 specifically comprises: connecting the first connecting line 251 and the outgoing line 2421, then connecting the first connecting line 251 and the first terminal of the data line awaiting for repair 211, and connecting the wire 2422 of the second repairing line 242 and the second terminal of the data line awaiting for repair 211; connecting the second connecting line 252 and the outgoing line 2411, then connecting the second connecting line 252 and the first terminal of the data line awaiting for repair 212, and connecting the wire 2412 of the first repairing line 241 and the second terminal of the data line awaiting for repair 212; connecting the first connecting line 251 and the outgoing line 2413, then connecting the first connecting line 251 and the first terminal of the data line awaiting for repair 213, and connecting the wire 2412 of the first repairing line 241 and the second terminal of the data line awaiting for repair 213.

The connecting way is by using a laser to fuse an insulative layer between the first and second connecting lines, the outgoing lines, and the data line awaiting for repair for conducting both.

Then the step 402 specifically comprises: cutting the first connecting line 251 at "D" point located between a connection point of the first connecting line 251 and the data line awaiting for repair 213 and a connection point of the first connecting line 251 and the data line awaiting for repair 211; cutting the first repairing line 241 at "E" point located between a connection point of the first repairing line 241 and the data line awaiting for repair 212 and a connection point of the first repairing line 241 and the data line awaiting for repair 213.

When a data signal is inputted into one end of data line awaiting for repair 211 from the driver 220, the data signal is transmitted to the connection point of the first connecting line 251 and the outgoing line 2421 after the data signal passing through the connection point of the data line awaiting for repair 211 and the first connecting line 251. Then the data signal is transmitted to the signal amplifier 261 along the outgoing line 2421, and the data signal is transmitted to the wire 2422 after being amplified by the signal amplifier 261. Then the data signal is inputted into the connection point of the data line awaiting for repair 211 and the wire 2422, thereby realizing the data signal transmission of the data line awaiting for repair 211. Similarly, the data signal transmission of the data lines awaiting for repair 212, 213 also can be realized.

From the method described above, two replaceable lines are formed by the first repairing line 241, and a replaceable line is formed by the second repairing line 242, thereby realizing the repairs of the data line awaiting for repair 211, the data line awaiting for repair 212, and the data line awaiting for repair 213 for the first package 231.

The above-mentioned repairing line system and the repair method can be utilized to realize the repair for the single package having the three data lines awaiting for repair. The single package can be any one of the first package, the second package, the third package, and the fourth package, as long as the connection points between the outgoing lines of the first repairing line 241 as well as the second repairing line 242 led from each package and the first connecting line 251 as well as the second connecting line 252 are changed.

Figure 5:
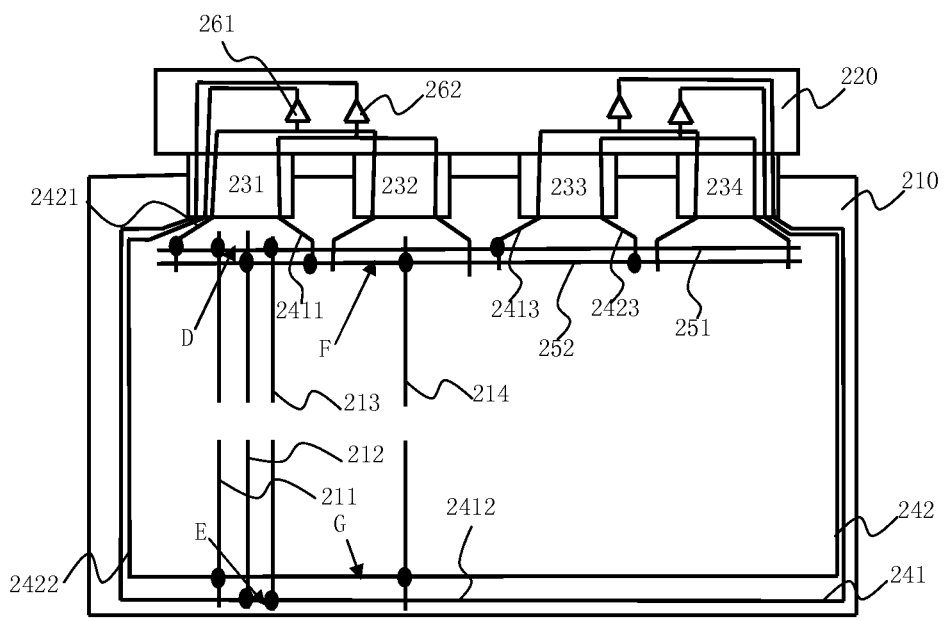
FIG. 5 is a schematic drawing illustrating a repairing line system and a repair method for repairing four data lines awaiting for repair according to the present invention.

FIG. 5 is a schematic drawing illustrating the repairing line system and the repair method for repairing four data lines awaiting for repair according to the present invention. When the data line awaiting for repair 211, the data line awaiting for repair 212, the data line awaiting for repair 213, and the data line awaiting for repair 214 exist on the substrate 210.

The step 401 specifically comprises: connecting the first connecting line 251 and the outgoing line 2421, then connecting the first connecting line 251 and the first terminal of the data line awaiting for repair 211, and connecting the wire 2422 of the second repairing line 242 and the second terminal of the data line awaiting for repair 211; connecting the second connecting line 252 and the outgoing line 2411, then connecting the second connecting line 252 and the first terminal of the data line awaiting for repair 212, and connecting the wire 2412 of the first repairing line 241 and the second terminal of the data line awaiting for repair 212; connecting the first connecting line 251 and the outgoing line 2413, then connecting the first connecting line 251 and the first terminal of the data line awaiting for repair 213, and connecting the wire 2412 of the first repairing line 241 and the second terminal of the data line awaiting for repair 213; connecting the second connecting line 252 and the outgoing line 2423, then connecting the second connecting line 252 and the first terminal of the data line awaiting for repair 214, and connecting the wire 2422 of the second repairing line 242 and the second terminal of the data line awaiting for repair 214.

The connecting way is by using the laser to fuse an insulative layer between the first and second connecting lines, the outgoing lines, and the data line awaiting for repair for conducting both.

Then the step 402 specifically comprises: cutting the first connecting line 251 at "D" point located between the connection point of the first connecting line 251 and the data line awaiting for repair 213 and the connection point of the first connecting line 251 and the data line awaiting for repair 211; cutting the first repairing line 241 at "E" point located between the connection point of the first repairing line 241 and the data line awaiting for repair 212 and the connection point of the first repairing line 241 and the data line awaiting for repair 213; cutting the second connecting line 252 at "F" point located between a connection point of the second connecting line 252 and the data line awaiting for repair 212 and a connection point of the second connecting line 252 and the data line awaiting for repair 214; cutting the second repairing line 242 at "G" point located between a connection point of the second repairing line 242 and the data line awaiting for repair 211 and a connection point of the second repairing line 242 and the data line awaiting for repair 214.

When a data signal is inputted into one end of data line awaiting for repair 211 from the driver 220, the data signal is transmitted to the connection point of the first connecting line 251 and the outgoing line 2421 after the data signal passing through the connection point of the data line awaiting for repair 211 and the first connecting line 251. Then the data signal is transmitted to the signal amplifier 261 along the outgoing line 2421, and the data signal is transmitted to the wire 2422 after being amplified by the signal amplifier 261. Then the data signal is inputted into the connection point of the data line awaiting for repair 211 and the wire 2422, thereby realizing the data signal transmission of the data line awaiting for repair 211. Similarly, the data signal transmission of the data lines awaiting for repair 212, 213 and 214 also can be realized.

Accordingly, two replaceable lines are formed by the first repairing line 241, and two replaceable lines are formed by the second repairing line 242, thereby realizing the repairs of the data line awaiting for repair 211, the data line awaiting for repair 212, the data line awaiting for repair 213, and the data line awaiting for repair 214.

Because of the connecting lines which insulatively intersect the data lines and the repairing lines in the present invention, when the data line is broken, the first terminals of the outgoing line and the data line awaiting for repair of the repairing line corresponding to the package are respectively coupled to the connecting line. Meanwhile, the wire of the corresponding repairing line is coupled to the second terminal of the data line awaiting for repair forming the replaceable lines thereby replacing the data lines awaiting for repair to perform the signal communication. Therefore, the multiple broken data lines occurring in the single package can be repaired.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A repair method of a repairing line system, the repairing line system comprising a plurality of packages, a substrate having a plurality of data lines awaiting for repair, two repairing lines, and two connecting lines, the repairing line comprising outgoing lines led from the packages and a wire disposed on three sides of the substrate without the packages disposed and coupled to the outgoing lines, wherein the repairing lines comprise a first repairing line and a second repairing line, and both the first repairing line and second repairing line comprise four outgoing lines, the four outgoing lines respectively led from a first, a second, a third and a fourth package, each terminal of the wire coupling to the two outgoing lines; the connecting line comprising a first connecting line and a second connecting line; characterized in that the repair method of the repairing line system comprises the steps of:

A, connecting the outgoing lines and first terminals of the data lines awaiting for repair via the connecting lines, and connecting the wire corresponding to the outgoing lines and second terminals of the data lines awaiting for repair, wherein step A specifically comprises:
connecting the first connecting line and the outgoing line of the second repairing line led from the first package, then connecting the first connecting line and the first terminal of the first data line awaiting for repair, connecting the wire of the second repairing line and the second terminal of the first data line awaiting for repair;

connecting the second connecting line and the outgoing line of the first repairing line led from the first package, then connecting the second connecting line and the first terminal of the second data line awaiting for repair, connecting the wire of the first repairing line and the second terminal of the second data line awaiting for repair;

connecting the first connecting line and the outgoing line of the first repairing line led from the third package, then connecting the first connecting line and the first terminal of the third data line awaiting for repair, connecting the wire of the first repairing line and the second terminal of the third data line awaiting for repair;

B, cutting the connecting line and the wire for separating a replaceable line using same connecting line and same wire, wherein step B specifically comprises:

cutting the first connecting line located between a connection point of the first connecting line and the first data line awaiting for repair and a connection point of the first connecting line and the third data line awaiting for repair;

cutting the first repairing line located between a connection point of the first repairing line and the second data line awaiting for repair and a connection point of the first repairing line and the third data line awaiting for repair; and C, amplifying data signals of the repairing lines.

2. A repair method of a repairing line system, the repairing line system comprising a plurality of packages, a substrate having a plurality of data lines awaiting for repair, two repairing lines, and two connecting lines, the repairing line comprising outgoing lines led from the packages and a wire disposed on three sides of the substrate without the packages disposed and coupled to the outgoing lines; characterized in that the repair method of the repairing line system comprises the step of:

A, connecting the outgoing lines and first terminals of the data lines awaiting for repair via the connecting lines, and connecting the wire corresponding to the outgoing lines and second terminals of the data lines awaiting for repair;

B, cutting the connecting line and the wire for separating a replaceable line using same connecting line and same wire.

3. The repair method according to claim 2, characterized in that the repairing lines comprises a first repairing line and a second repairing line, and both the first repairing line and second repairing line comprise four outgoing lines, the four outgoing lines respectively led from a first, a second, a third and a fourth package, each terminal of the wire coupling to the two outgoing lines; the connecting line comprising a first connecting line and a second connecting line.

4. The repair method according to claim 3, the data lines awaiting for repair comprising a first data line awaiting for repair, a second data line awaiting for repair and a third data line awaiting for repair, characterized in that the step A specifically comprises:

connecting the first connecting line and the outgoing line of the second repairing line led from the first package, then connecting the first connecting line and the first terminal of the first data line awaiting for repair, connecting the wire of the second repairing line and the second terminal of the first data line awaiting for repair;

connecting the second connecting line and the outgoing line of the first repairing line led from the first package, then connecting the second connecting line and the first terminal of the second data line awaiting for repair, connecting the wire of the first repairing line and the second terminal of the second data line awaiting for repair;

connecting the first connecting line and the outgoing line of the first repairing line led from the third package, then connecting the first connecting line and the first terminal of the third data line awaiting for repair, connecting the wire of the first repairing line and the second terminal of the third data line awaiting for repair.

5. The repair method according to claim 4, characterized in that the step B specifically comprises:

cutting the first connecting line located between a connection point of the first connecting line and the first data line awaiting for repair and a connection point of the first connecting line and the third data line awaiting for repair;

cutting the first repairing line located between a connection point of the first repairing line and the second data line awaiting for repair and a connection point of the first repairing line and the third data line awaiting for repair.

6. The repair method according to claim 3, the data lines awaiting for repair comprising a first data line awaiting for repair, a second data line awaiting for repair, a third data line awaiting for repair and a fourth data line awaiting for repair, characterized in that the step A specifically comprises:

connecting the first connecting line and the outgoing line of the second repairing line led from the first package, then connecting the first connecting line and the first terminal of the first data line awaiting for repair, connecting the wire of the second repairing line and the second terminal of the first data line awaiting for repair;

connecting the second connecting line and the outgoing line of the first repairing line led from the first package, then connecting the second connecting line and the first terminal of the second data line awaiting for repair, connecting the wire of the first repairing line and the second terminal of the second data line awaiting for repair;

connecting the first connecting line and the outgoing line of the first repairing line led from the third package, then connecting the first connecting line and the first terminal of the third data line awaiting for repair, connecting the wire of the first repairing line and the second terminal of the third data line awaiting for repair;

connecting the second connecting line and the outgoing line of the second repairing line led from the third package, then connecting the second connecting line and the first terminal of the fourth data line awaiting for repair, connecting the wire of the second repairing line and the second terminal of the fourth data line awaiting for repair.

7. The repair method according to claim 6, characterized in that the step B specifically comprises:

cutting the first connecting line located between a connection point of the first connecting line and the third data line awaiting for repair and a connection point of the first connecting line and the first data line awaiting for repair;

cutting the first repairing line located between a connection point of the first repairing line and the second data line awaiting for repair and a connection point of the first repairing line and the third data line awaiting for repair;

cutting the second connecting line located between a connection point of the second connecting line and the second data line awaiting for repair and a connection point of the second connecting line and the fourth data line awaiting for repair;

cutting the second repairing line located between a connection point of the second repairing line and the first data line awaiting for repair and a connection point of the second repairing line and the fourth data line awaiting for repair.

8. A repair method of a repairing line system, the repairing line system comprising a plurality of packages, a substrate having a plurality of data lines awaiting for repair, two repairing lines, and two connecting lines, each repairing line comprising outgoing lines led from the packages and a wire disposed on three sides of the substrate without the packages disposed and coupled to the outgoing lines, wherein the repairing lines comprise a first repairing line and a second repairing line, and both the first repairing line and second repairing line comprise four outgoing lines, the four outgoing lines respectively led from a first, a second, a third and a fourth package, each terminal of the wire coupling to the two outgoing lines; the connecting line comprising a first connecting line and a second connecting line; characterized in that the repair method of the repairing line system comprises the steps of:

A, connecting the outgoing lines and first terminals of the data lines awaiting for repair via the connecting lines, and connecting the wire corresponding to the outgoing lines and second terminals of the data lines awaiting for repair, wherein the step A specifically comprises:

connecting the first connecting line and the outgoing line of the second repairing line led from the first package, then connecting the first connecting line and the first terminal of the first data line awaiting for repair, connecting the wire of the second repairing line and the second terminal of the first data line awaiting for repair;

connecting the second connecting line and the outgoing line of the first repairing line led from the first package, then connecting the second connecting line and the first terminal of the second data line awaiting for repair, connecting the wire of the first repairing line and the second terminal of the second data line awaiting for repair;

connecting the first connecting line and the outgoing line of the first repairing line led from the third package, then connecting the first connecting line and the first terminal of the third data line awaiting for repair, connecting the wire of the first repairing line and the second terminal of the third data line awaiting for repair;

connecting the second connecting line and the outgoing line of the second repairing line led from the third package, then connecting the second connecting line and the first terminal of the fourth data line awaiting for repair, connecting the wire of the second repairing line and the second terminal of the fourth data line awaiting for repair;

B, cutting the connecting line and the wire for separating a replaceable line using same connecting line and same wire, wherein the step B specifically comprises:

cutting the first connecting line located between a connection point of the first connecting line and the third data line awaiting for repair and a connection point of the first connecting line and the first data line awaiting for repair;

cutting the first repairing line located between a connection point of the first repairing line and the second data line awaiting for repair and a connection point of the first repairing line and the third data line awaiting for repair;

cutting the second connecting line located between a connection point of the second connecting line and the second data line awaiting for repair and a connection point of the second connecting line and the fourth data line awaiting for repair;

cutting the second repairing line located between a connection point of the second repairing line and the first data line awaiting for repair and a connection point of the second repairing line and the fourth data line awaiting for repair; and C, amplifying data signals of the repairing lines.

* * * * *